United States Patent Office 3,402,489
Patented Sept. 24, 1968

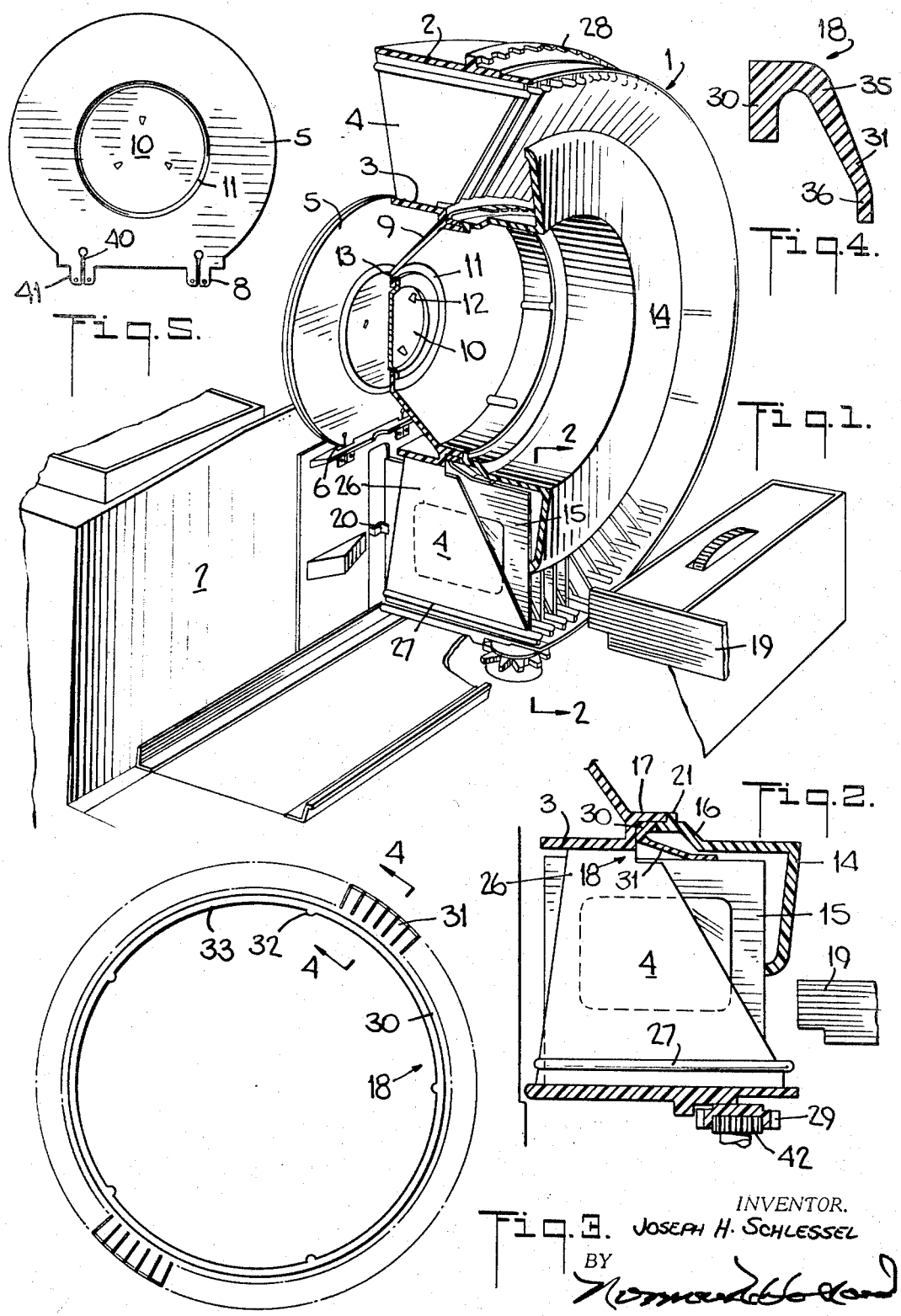

3,402,489
MAGAZINE WITH SLIDE RETENTION MEANS
Joseph H. Schlessel, 7A Sycamore Road,
Great Neck, N.Y. 11021
Filed June 24, 1966, Ser. No. 560,263
8 Claims. (Cl. 40—79)

ABSTRACT OF THE DISCLOSURE

A circular slide magazine having a circular plastic slide retaining member with a flange portion fitting into a groove in one of the magazine walls and flexible slide retention fingers extending from the flange into each of the slide compartments. The slide retaining fingers are curved and of progressively decreasing thickness from their juncture with the flange to their tips so that when the fingers are engaged by the inserted slides the deformation of the springs is distributed along their lengths thereby avoiding localized yielding and uneven bending and spring action.

---

The present invention relates to an improved slide magazine and more particularly to an improved slide magazine having a resilient slide retaining means particularly useful for circular magazines.

Magazines for storing and exhibiting a number of individual slides are well-known and certain of these magazines have been made in a rotary or circular form. These slide magazines are mounted for rotation about a central axis on a slide projecting or viewing device. The magazine of the present invention provides an improved structure particularly useful for such a rotary magazine providing for improved slide positioning and slide retention and is an improvement of the magazine of United States patent application Ser. No. 400,137 filed Sept. 29, 1964, and owned by the assignee of the present invention.

Accordingly an object of the present invention is to provide an improved slide magazine.

Another object of the present invention is to provide an improved slide retention means for a slide storage magazine.

Another object of the present invention is to provide an improved circular slide storage magazine.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a perspective view partially in section illustrating a preferred embodiment of the magazine shown in position on a typical slide projector;

FIG. 2 is a sectional view of the magazine taken along line 2—2 of FIG. 1;

FIG. 3 is a side elevational view of the improved slide retention member;

FIG. 4 is a vertical sectional view of the slide retention member taken along line 4—4 on FIG. 3; and FIG. 5 is a fragmentary side elevational view of the magazine mounting plate.

The magazine accommodates a relatively large number of individual slides such as the well-known paper mounted colored slides or transparencies. A magazine having a diameter of about eight inches will accommodate 100 of the conventional 2 x 2 inch transparencies. The slides are removably positioned in radial compartments provided between an outer cylindrical wall 2 and an inner cylindrical wall 3. The individual slide compartments or pockets are defined by radially directed dividers 4 extending between the outer and inner walls 2 and 3. In the preferred embodiment, the inner and outer walls and the dividers 4 are molded as an integral unit.

The preferred mounting for rotatably supporting the magazine 1 on a projector comprises a support plate 5 which is detachably mounted in spaced apertures 6 on the slide projector 7 by the spaced support tabs 8. This support plate 5 is rotatably connected to a central support 9 on the magazine 1 by a bearing 10 having a flange 11 and conveniently attached to the plate 5 by rivets 12 or other connecting means so that the flange 11 slidably engages the inner circular edge 13 of the magazine center support 9.

The conically shaped center portion 9 of the magazine 1 is also preferably and most conveniently formed integrally with the inner and outer circular walls 2 and 3 of the magazine 1 and is molded together with these portions and the compartment dividers 4 as a single unit.

A circular hub 14 on the magazine 1 holds the slides 15 in the compartments at the correct storage position as illustrated by the slide 15 shown at the bottom of the magazine 1 in FIG. 1. The hub 14 is mounted on the magazine 1 by means of an inwardly projecting flange 16 which engages a complementary flange 17 on the center portion 9. The flange 16 is atached to the flange 17 by a friction fit and preferably by an additional attachment such as by a light coating of adhesive.

In order to resiliently retain each of the slides 15 in the magazine 1 during storage, handling, and projection, a resilient slide retaining member is preferably provided in the magazine 1. A preferred embodiment of this retaining member is the annular plastic retention member 18 illustrated in FIG. 3. The retention member 18 engages each slide with sufficient force to retain it in the magazine 1 against its own weight and the normal forces encountered in magazine handling but loosely enough so that it does not interfere with slide movement to and from the magazine during projection such as by a silde transfer member 19 and a cooperating pusher bar 20.

FIGS. 3 and 4 illustrate the preferred embodiment of the retention member 18. The retention member 18 preferably comprises a unitary molded circular plastic spring having a circular center flange 30 and a series of individual radially extending spring fingers 31 with one spring finger 31 provided for each slide compartment in the magazine. Several inwardly extending keys 32 are also preferably formed on the inner edge 33 of the center flange 30 to enter complementary slots 34 formed in the flange portion 17 of the magazine center portion 9 which engages the center flange 30 of the retention member 18 as best illustrated in FIG. 2. As also illustrated in FIG. 2, the spring fingers 31 extend radially outwardly into each slide compartment in position to lightly engage the side of a slide 15.

FIG. 4 illustrates the preferred shape of the cross-section of the slide retention member 18. The member 18 is seen to include the circular center flange 30 for anchoring the retention member 18 in place in the magazine and for supporting the outwardly directed spring fingers 31. In order to assure a uniform flexure throughout the length of each spring finger 31 under the pressure of the inserted slide 15, each of the spring fingers 31 is formed with a progressively decreasing thickness from its relatively wide attached portion 35 outwardly towards its narrower free end portion 36. This progressive narrowing of the spring finger 31 width distributes the flexing action of the spring finger 31 throughout its length thereby preventing any localized sharp bending of the spring finger 31 which would contribute to undesirable increased localized stresses in the spring finger thereby increasing the possibility of fatigue in the spring finger material or to a localized bending which might exceed the elastic limit of the plastic material.

A preferred plastic material for the molded plastic spring has been found to be nylon or the acetal resin sold under the trademark Celcon owned and manufactured by Celanese Corp. of America. In addition to providing suitable spring properties, the plastic of the spring fingers 31 provides a desirable degree of sliding surface engagement with the slides in the compartments to facilitate their removal and re-entry.

The slide retention member 18 is conveniently mounted in the magazine 1 by being gripped between the hub 14 and the inner wall 3 in an annular channel formed by the radial flange 17 and a flange or step 21 on the inner edge of the hub flange 16 as best illustrated in FIG. 2.

When the hub 14 is connected to the flange 17, the annular channel formed between the step 21 of the hub 14 and the inner wall 3 grips and confines the center flange 30 of retention member 18 leaving its spring fingers 31 in position where each one enters into the slide retaining compartments.

Thus, an extremely efficient gripping action is obtained by the retention member 18 giving an excellent combination of slide retention and slide releasing properties. The above described retention member 18 is particularly advantageous for a circular slide tray as it is conveniently formed as an annular element providing uniform slide retention characteristics throughout its entire circumference.

The radially directed compartment dividers 4 of the magazine 1 are preferably made as thin as possible to permit the maximum number of slides to be retained in the magazine and to provide a light and attractive magazine. For this reason, the inner portions 26 of the dividers 4 are preferably made thinner than the outer portions causing the compartments to have an outwardly flared shape. The molded and rounded guides 27 at the outer portion of the compartments compensate for the flaring arrangement of the radially oriented dividers 4 and act to hold in the slides 15 in a generally radial position in the compartments.

As indicated above the magazine 1 is rotatably mounted on the projector 7 on a mounting plate 5 having flexible slot engaging tabs 8 divided by a slit 40 and including locking detents 41 to cause the plate 5 to be releasably locked into apertures 6. A circular rack 28 is formed on the outer wall 2 of the magazine in position for engagement with a magazine indexing pinion 29 which intermittently advances to move the slide compartments into position adjacent to the transfer arm 19 and the pusher bar 20.

A projector such as the one illustrated preferably accommodates both circular and straight magazines. Since the individual slide receiving compartments of the circular magazines are generally wider than those required for the straight magazines, the pinion and the cooperating rack for indexing the circular magazine necessarily advance the magazine a greater distance during each indexing operation. In the preferred embodiment illustrated, this difference is conveniently compensated for by providing for a removable pinion 29 for the circular magazine (FIG. 2) which is dropped over the smaller pinion 42 provided for indexing a straight magazine through the same projector.

It will be seen that an improved circular magazine has been provided and particularly a magazine adapted for use with a unitary molded plastic slide retention member. The retention member is easily inserted into the cooperating molded portions of the magazine. The plastic retention member including its individual plastic retention springs has been found to provide an excellent retentive force with the individual spring fingers themselves having a light sliding engagement with the slides due to both the properties of the plastic itself and due to the molded nature of the spring fingers which permits their cross-section to be progressively thickened inwardly of the spring fingers to provide a distributed flexing action throughout the length of the spring fingers.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A circular slide magazine comprising the combination of a pair of concentric and radially spaced generally cylindrical wall members, radially directed dividers positioned intermediate said wall members forming a plurality of slide storage compartments, an annular channel in the innermost of said wall members opening into said compartments, a unitary molded plastic annular slide retention member, said retention member having an elongated anchoring flange positioned at least partially in said channel and having individual resilient slide engaging fingers extending radially outwardly from said flange into each of said compartments for releasably engaging the edges of slides therein for retaining the slides in said magazine, and said fingers having a progressively reduced cross-section outwardly from said flange.

2. The slide magazine as claimed in claim 1 in which said innermost wall comprises an inner portion and an outer portion and said channel is formed by adjacent surfaces of said inner and outer portions.

3. The slide magazine as claimed in claim 1 in which said slide retention member comprises an acetal resin.

4. In a slide magazine having a plurality of slide receiving compartments formed by a plurality of opposing wall members and divider members extending laterally between the wall members an improved slide retention means comprising the combination of a unitary molded plastic slide retaining member having an elongated mounting flange portion, a plurality of individual slide engaging spring fingers extending outwardly from said flange, and said spring fingers having a progressively reducing cross-sectional area outwardly from said flange.

5. The slide magazine as claimed in claim 4 in which said slide retaining member comprises an acetal resin.

6. An improved slide retention member for the compartments of slide magazines comprising the combination of a unitary molded plastic slide retaining member having an elongated mounting flange portion, a plurality of individual slide engaging spring fingers extending generally laterally of said flange, and said spring fingers having a progressively reducing cross-sectional area outwardly from said flange.

7. The retention member as claimed in claim 9 in which said flange is circular and said spring fingers are radially directed.

8. The slide retention member as claimed in claim 6 which comprises an acetal resin.

References Cited

UNITED STATES PATENTS

| | | |
|---|---|---|
| 2,375,357 | 5/1945 | Friedman. |
| 2,547,239 | 4/1951 | Walker. |
| 3,209,647 | 10/1965 | Hall. |
| 3,304,639 | 2/1967 | Wiklund _____ 40—79 |

EUGENE R. CAPOZIO, *Primary Examiner.*

W. GRIEB, *Assistant Examiner.*